US010457257B2

(12) United States Patent
Han et al.

(10) Patent No.: US 10,457,257 B2
(45) Date of Patent: Oct. 29, 2019

(54) DRIVING SUPPORT APPARATUS AND DRIVING SUPPORT METHOD

(71) Applicant: MANDO CORPORATION, Pyeongtaek-si, Gyeonggi-do (KR)

(72) Inventors: Jae Hyun Han, Seoul (KR); Oh Cheol Heo, Suwon-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 276 days.

(21) Appl. No.: 15/430,538

(22) Filed: Feb. 13, 2017

(65) Prior Publication Data

US 2017/0240149 A1 Aug. 24, 2017

(30) Foreign Application Priority Data

Feb. 22, 2016 (KR) ........................ 10-2016-0020453

(51) Int. Cl.
*B60T 8/171* (2006.01)
*G05D 1/02* (2006.01)
(Continued)

(52) U.S. Cl.
CPC ............... *B60T 8/171* (2013.01); *B60T 7/22* (2013.01); *B60T 8/321* (2013.01); *G05D 1/0246* (2013.01); *G06K 9/00798* (2013.01); *G06T 7/50* (2017.01); *G06T 7/62* (2017.01); *G06T 7/70* (2017.01); *G08G 1/166* (2013.01); *H04N 5/2352* (2013.01); *B60T 2201/022* (2013.01); *B60T 2210/36* (2013.01); *G06T 2207/30256* (2013.01); *G06T 2207/30261* (2013.01)

(58) Field of Classification Search
CPC .... G06T 7/70; G06T 7/60; G06T 7/80; G06K 9/46; G06K 9/00369; G06K 9/00255; G06K 9/00275; G06K 9/627; G06K 9/00; G06K 9/00281; G06K 9/00288; G06K 9/3233; G06K 9/4628; G06K 9/62; G06K 9/66; B60W 30/12; B60W 2550/306; B60W 2420/42; B60W 30/16; B60W 30/14; B60W 30/165; B60W 2420/403; B60W 2550/308
See application file for complete search history.

(56) References Cited

U.S. PATENT DOCUMENTS

| | | | | |
|---|---|---|---|---|
| 2005/0159876 A1* | 7/2005 | Sugano | ............ | B60K 31/0008 701/96 |
| 2015/0151725 A1* | 6/2015 | Clarke | ................ | B60W 30/00 701/28 |
| 2016/0055395 A1* | 2/2016 | Macciola | ................ | G06T 3/00 382/190 |

* cited by examiner

*Primary Examiner* — Hussein Elchanti
*Assistant Examiner* — Paul A Castro
(74) *Attorney, Agent, or Firm* — Hauptman Ham, LLP

(57) ABSTRACT

Disclosed relates to a driving support apparatus including at least: a detection unit that detects a driving lane on which a user's vehicle and a front vehicle located in front of the user's vehicle are driving based on image data output from a camera; a first calculation unit that calculates a second front vehicle width for the front vehicle based on a first front vehicle width for the front vehicle measured on the image data, a first driving lane width for the driving lane measured on the image data, and a second driving lane width predetermined according to a characteristic of the driving lane; and a second calculation unit that calculates a distance from the front vehicle based on a focal length of the camera, the first front vehicle width, and the second front vehicle width, thereby precisely measuring the distance from the front vehicle based on camera image data.

10 Claims, 8 Drawing Sheets

(51) Int. Cl.
*H04N 5/235* (2006.01)
*G06T 7/70* (2017.01)
*B60T 8/32* (2006.01)
*G06K 9/00* (2006.01)
*G08G 1/16* (2006.01)
*G06T 7/50* (2017.01)
*G06T 7/62* (2017.01)
*B60T 7/22* (2006.01)

DRIVING SUPPORT APPARATUS AND DRIVING SUPPORT METHOD

CROSS REFERENCE TO RELATED APPLICATION

This application claims priority from Korean Patent Application No. 10-2016-0020453, filed on Feb. 22, 2016, which is hereby incorporated by reference for all purposes as if fully set forth herein.

BACKGROUND OF THE INVENTION

1. Field of the Invention

The present invention relates to a driving support technology and, more particularly, to an apparatus and a method for supporting vehicle driving by accurately estimating a width of a front vehicle based on camera image data and calculating a distance from the front vehicle based on the estimated width.

2. Description of the Prior Art

Recently, intelligent vehicles that prioritize driving convenience and safety have been improved and, under such a trend, various driver assistance devices that assist a driver to enable the driver to conveniently drive have been installed.

Such an Advanced Driver Assistance System (ADAS) includes a camera sensor. The camera sensor provides a safer driving environment by detecting front, back, left, and right spaces including a blind spot that a driver cannot see.

The camera sensor may be divided into three types according to a detection area.

A first camera sensor is for monitoring the front and is installed to receive a front image. Such a system aims to keep a lane and prevent collision by detecting a front lane or a front vehicle during driving. A second camera sensor is for monitoring the side back and aims to prevent collision and monitor a blind spot when a driver changes a lane by detecting an image of the blind spot including left and right sides of the vehicle. A third camera sensor is for monitoring the back and is installed to receive a back image of the vehicle, and aims to monitor the back when a driver backs up or parks the vehicle.

For the above described three aims, the camera sensors that are used should more accurately detect a distance from an object including a lane and a vehicle.

Accordingly, a technology for detecting the horizon in image data output by a camera device and more accurately detecting a distance from an object based on a location of the detected horizon has been developed and used, but the technology cannot be applied since the horizon is not detected in the image data output by the camera device due to an actual surrounding environment (hidden by a building and a change in a detection area according to driving on a downhill road).

SUMMARY OF THE INVENTION

Under such a background, according to an aspect, an objective of the present invention is to provide a driving support technology that may more accurately detect a distance from a front vehicle regardless of an actual driving environment.

Another objective of the present invention is to provide an apparatus and a method of estimating a front vehicle width based on image data photographed by a vehicle front camera and preset driving lane information and precisely measuring a distance from a front vehicle based on the estimated front vehicle width.

In accordance with an aspect of the present invention, a driving support apparatus is provided. The driving support apparatus includes: a detection unit configured to detect a front vehicle located in front of a user's vehicle and a driving lane on which the user's vehicle or the front vehicle is driving based on image data output from a camera which detects the front; a first calculation unit configured to calculate a second front vehicle width for the front vehicle based on a first front vehicle width for the front vehicle detected by the camera, a first driving lane width for the driving lane detected by the camera, and a preset second driving lane width for the driving lane; and a second calculation unit configured to calculate a distance from the front vehicle based on a focal length of the camera, the first front vehicle width, and the second front vehicle width.

In accordance with another aspect of the present invention, a driving support method is provided. The driving support method includes: a detection step of detecting a front vehicle located in front of a user's vehicle and a driving lane on which the user's vehicle or the front vehicle is driving based on image data output from a camera which detects the front; a first calculation step of calculating a second front vehicle width for the front vehicle based on a first front vehicle width for the front vehicle detected by the camera, a first driving lane width for the driving lane detected by the camera, and a preset second driving lane width for the driving lane; and a second calculation step of calculating a distance from the front vehicle based on a focal length of the camera, the first front vehicle width, and the second front vehicle width.

According to the present invention as described above, it is possible to provide a driving support technology that can more accurately detect the distance from the front vehicle regardless of the actual driving environment.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
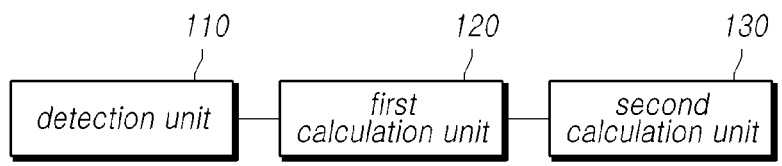
FIG. 1 illustrates a configuration of a driving support apparatus according to an embodiment of the present invention.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 illustrates a configuration of a driving support apparatus according to an embodiment of the present invention.

Referring to FIG. 1, a driving support apparatus 100 according to an embodiment of the present invention may include a detection unit 110 for detecting a front vehicle located in front of a user's vehicle and a driving lane on which the user's vehicle or the front vehicle is driving based on image data output from a camera that detects the front, a first calculation unit 120 for calculating a second front vehicle width for the front vehicle based on a first front vehicle width for the front vehicle detected by the camera, a first driving lane width for the driving lane detected by the camera, and a second driving lane width for the driving lane on the basis of preset driving lane information, and a second calculation unit 130 for calculating a distance from the front vehicle based on a focal length of the camera, the first front vehicle width, and the second front vehicle width.

The detection unit 110 may include a camera including a light collector such as a lens for receiving light, an imaging unit for converting the light received through the light collector into image data, and a control unit for controlling a state.

The light collector corresponds to an element for receiving light and forming an image on the imaging unit, and there are various schemes from a simple scheme using a small hole, such as a pinhole camera model, to a complicated scheme using various types of multiple lenses. A light collector of a general camera includes a lens, an aperture, and a unit for controlling a distance of the lens. In general, the light collector is also called a photographic lens. The imaging unit corresponds to an element on which an image is formed by the light from the light collector. While a film camera makes a photo by putting a film having photosensitivity on the imaging unit to perform photography and developing and printing the film, a digital camera puts a device (CMOS or CCD) for converting a light signal to an electrical signal on the imaging unit and stores a digital image converted into the electrical signal as various types of image files in a storage medium. The control unit corresponds to an element operating to acquire a desired image and may representatively include an aperture for controlling a hole size of the light collector and a shutter for receiving or blocking the light. For example, proper imaging may be made through a decrease in light by reducing the hole size of the aperture in a bright place and an increase in light by opening the aperture in a dark place. Further, a still image may be made by making an operation of the shutter fast with respect to a fast motion of an athlete. In addition, the control unit may include devices such as a flash for photographing in a dark place and a viewfinder that the user looks through in advance in order to see what the user going to photograph.

That is, when the detection unit 110 detects the front vehicle and the driving lane, light for the front vehicle and the driving lane is incident to the lens of the detection unit 110. Then, the detection unit 110 may measure the first front vehicle width for the front vehicle based on image data photographed by the light and a focal length of the lens and the first driving lane width for the driving lane on which the user's vehicle is driving.

Further, the detection unit 110 may re-control settings of the camera based on information on one or more objects other than the detected front vehicle and driving lane. The control of the settings of the camera may include a brightness control and a white balance control, that is, controlling some characteristics involved in the output of the image data.

According to the control of the settings of the camera, the detection unit 110 may have an effect of more accurately detecting the front vehicle and the driving lane from the image data photographed by the camera. Accordingly, the distance from the front vehicle calculated by the driving support apparatus 100 according to the embodiment of the present invention may be more accurate.

The first calculation unit 120 may calculate the second front vehicle width for the front vehicle based on the first front vehicle width and the first driving lane width detected by the detection unit 110 and second driving lane width information of the driving lane on which the user's vehicle is driving on the basis of the already known driving lane information.

The second driving lane width may be predetermined by a driving lane characteristic of the driving lane on which the user's vehicle is driving and, at this time, the driving lane characteristic may include one or more of a region where the driving lane exists, a road type of the driving lane, and a limited speed of the driving lane.

Further, the second driving lane width may be set based on at least one of the location information on the user's vehicle, driving information of the user's vehicle, and object information detected by the detection unit.

More specifically, the driving lane characteristic that determines the second driving lane width is preset according to one or more pieces of information on a country or a region where the lane exists, a type of the driving lane, and limited speed information of the driving lane, and thus correspond to information which can be recognized by the first calculation unit 120.

The driving lane characteristic information may be extracted from a navigation map installed in the vehicle but not limited thereto, and may be also extracted from image data generated by photographing a sign, traffic information, and lane information by the camera.

The type of the lane included in the driving lane characteristic information may correspond to an expressway or a local road (a national road or a general road).

The lane type information or the road type information included in the driving lane characteristic information and information on facilities may be required by its regulations according to each country, each road, and each region.

For example, with respect to the rule of the expressway of Korea, a lane with of the expressway located in a local area corresponds to 3.5 m, a lane width of the expressway located in a city area corresponds to 3.5 m, and a lane width of a small vehicle road belonging to the expressway corresponds to 3.25 m.

A lane width of the general road of Korea is determined in more detail according to limited speed information.

In a first example, with respect to the rule of the general road, a lane width of the general road that is located in a local area and has a design speed faster than or equal to 80 km/h corresponds to 3.5 m, a lane width of the general road that is located in a city area and has a design speed faster than or equal to 80 km/h corresponds to 3.25 m, and a lane width of a small vehicle road belonging to the general road having a design speed faster than or equal to 80 km/h corresponds to 3.25 m.

In a second example, with respect to the rule of the general road, a lane width of the general road that is located in a local area and has a design speed faster than or equal to 70 km/h corresponds to 3.25 m, a lane width of the general road that is located in a city area and has a design speed faster than or equal to 70 km/h corresponds to 3.25 m, and a lane width of a small vehicle road belonging to the general road having a design speed faster than or equal to 70 km/h corresponds to 3.00 m.

In a third example, with respect to the rule of the general road, a lane width of the general road that is located in a local area and has a design speed faster than or equal to 60 km/h corresponds to 3.25 m, a lane width of the general road that is located in a city area and has a design speed faster than or equal to 60 km/h corresponds to 3.00 m, and a lane width of a small vehicle road belonging to the general road having a design speed faster than or equal to 60 km/h corresponds to 3.00 m.

In a fourth example, with respect to the rule of the general road, a lane width that is located in a local area and has a design speed slower than 60 km/h corresponds to 3.00 m, a lane width that is located in a city area and has a design speed slower than 60 km/h corresponds to 3.00 m, and a lane width of a small vehicle road belonging to the general road having a design speed slower than 60 km/h corresponds to 3.00 m.

That is, the second driving lane width may be predetermined based on the location information or region information of the user's vehicle, information on the type of the driving lane on which the user's vehicle is driving, a limited speed, or road design speed information.

Further, the first calculation unit 120 may further use driving information of the user's vehicle or object information detected by the detection unit 110 to determine the second driving lane width.

At this time, the driving information of the user's vehicle may be information including speed information, brake information, and steering information, and the object information may include information on facilities on the road and information on signs.

The first calculation unit 120 may calculate second front vehicle width information for the front vehicle based on a proportional relation of the predetermined second driving lane with information, the first front vehicle width information, and the first driving lane width calculated from the camera image data.

As described above, a detailed configuration for calculating the second front vehicle width information by the first calculation unit 120 will be described in more detail with reference to FIG. 4A and equation (1) below.

The second calculation unit 130 may calculate the distance from the front vehicle based on the focal length of the light collector (lens) included in the detection unit 110, the first front vehicle width information measured by the detection unit 110, and the second front vehicle width information calculated by the first calculation unit 120.

Figure 4A:
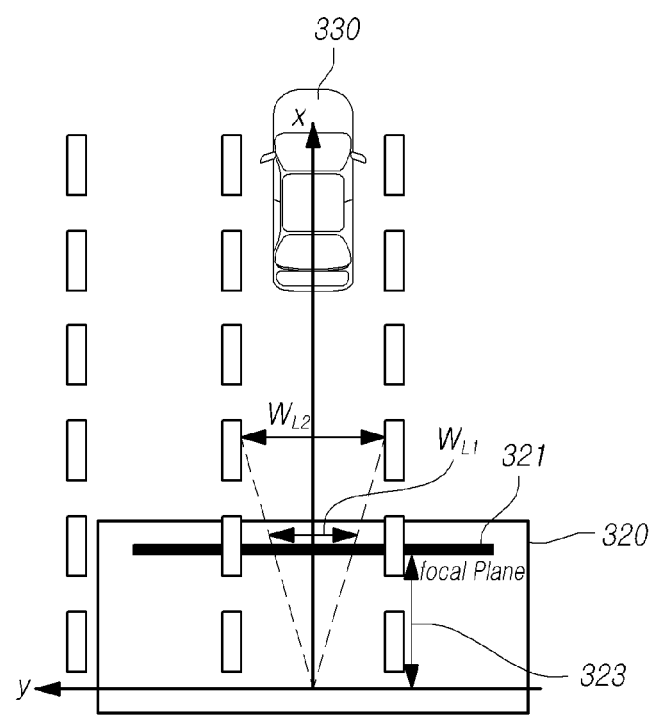
FIG. 4A illustrates an example for describing an operation of a first calculation unit according to an embodiment of the present invention.
Figure 4B:
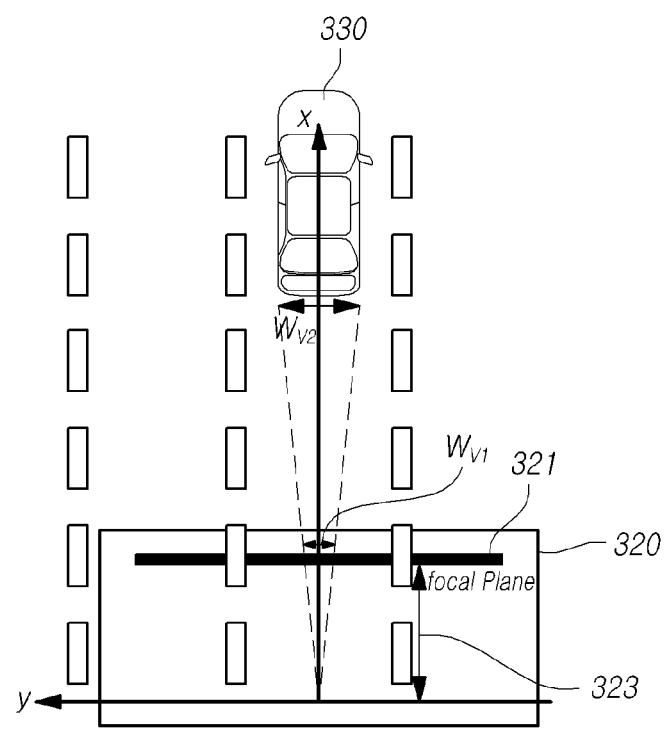
FIG. 4B illustrates another example for describing the operation of the first calculation unit according to an embodiment of the present invention.

That is, as described in FIGS. 4A and 4B, a ratio between the focal length of the camera and the distance from the front vehicle corresponds to a distance ratio between the first front vehicle width and the second front vehicle width.

That is, the second calculation unit 130 may accurately calculate the distance from the front vehicle by applying the focal length information of the light collector included in the detection unit 110, the first front vehicle width information measured by the detection unit, and the second front vehicle width calculated by the first calculation unit 120 to the corresponding relation.

As described above, a detailed configuration for calculating the accurate distance from the front vehicle by the second calculation unit 130 based on the focal length of the detection unit 110, the first front vehicle width information measured by the detection unit, and the second front vehicle width information calculated by the first calculation unit 120 will be described in more detail with reference to FIG. 4B and equation (2) below.

While the distance from the front vehicle recognized through the camera device may have a predetermined error, the distance from the front vehicle can be more accurately recognized by the driving support apparatus 100 according to the embodiment of the present invention.

Hereinafter, the driving support apparatus 100 according to the embodiment of the present invention will be described in more detail with reference to FIGS. 2 to 4.

Figure 2:
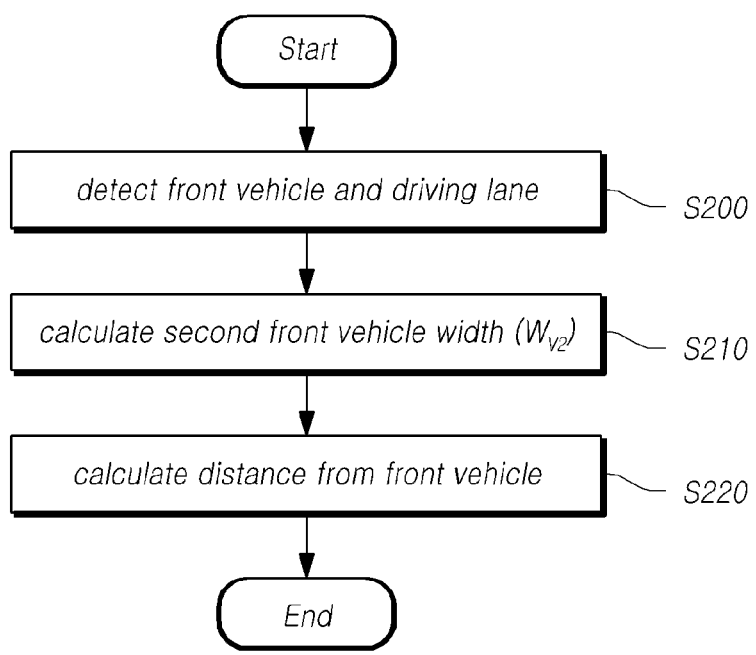
FIG. 2 illustrates an example for describing an operation of the driving support apparatus according to an embodiment of the present invention.

FIG. 2 illustrates an example for describing an operation of the driving support apparatus according to an embodiment of the present invention.

Referring to FIG. 2, the detection unit of the driving support apparatus according to the embodiment of the present invention may detect the user's vehicle and the front vehicle located in front of the user's vehicle or the driving lane on which the front vehicle is driving based on image data output by the camera that detects the front in S200.

Figure 3:
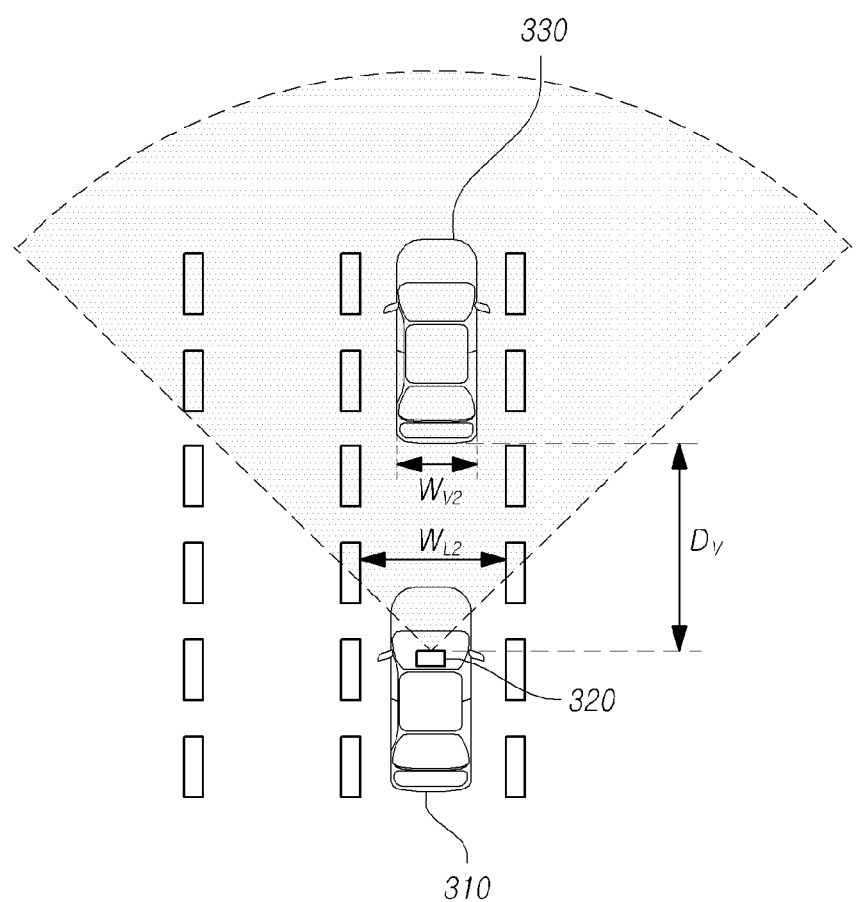
FIG. 3 illustrates another example for describing the operation of the driving support apparatus according to an embodiment of the present invention.

Referring to FIG. 3 for a detailed description, the detection unit may detect a front vehicle 330 based on vehicle information already known from image data output by a camera 320, and may detect lanes that classify a driving lane based on already known lane information.

The vehicle information may include a shape of the back of the vehicle and a color of the back of the vehicle, and the lane information may include the value of a width of the lane, a value of a length of the lane, and a color of the lane. In addition to the above description, the vehicle information and the lane information may include some information which may be used for recognizing the vehicle and some information which may be used for recognizing the lane, respectively.

However, the first front vehicle width for the front vehicle and the first driving lane width for the driving lane detected in step S200 refer to widths for an image of the front vehicle formed on the lens of the camera that outputs the image data and an image for the driving lane.

In other words, sizes of the first front vehicle width and the first driving lane width measured by the detection unit 110 may have the same values as sizes of the front vehicle width and the driving lane width on the image photographed by the imaging unit of the camera.

At this time, the first front vehicle width and the first driving lane width detected in step S200 are different from an actual value of an actual front vehicle width and an actual value of the driving lane width, and the second front vehicle width corresponding to the size of the actual front vehicle width is calculated using the predetermined second driving lane width information.

A detailed description thereof will be made in detail with reference to FIGS. 4A and 4B.

FIGS. 4A and 4B illustrate examples for describing operations of the first calculation unit and the second calculation unit according to an embodiment of the present invention.

Referring to FIG. 4A, the driving lane width detected by the camera 320 becomes a first driving lane width $W_{L1}$ defined as a distance between lanes on the image photographed or formed on the lens 321 of the camera 320.

At this time, the first driving lane width $W_{L1}$ is different from a second driving lane width $W_{L2}$ corresponding to a width length between actual lanes.

Similarly, referring to FIG. 4B, a width of a front vehicle 330 detected by the camera 320 becomes a first front vehicle width $W_{V1}$ corresponding to a width of the front vehicle 330 on the image photographed or formed on the lens 321 of the camera 320.

At this time, the first front vehicle width $W_{V1}$ is different from a second front vehicle width $W_{V1}$ corresponding to a width of the actual front vehicle 330.

As illustrated in FIGS. 4A and 4B, a proportional relation is established between the first driving lane width $W_{L1}$ and first front vehicle width $W_{V1}$ measured by the detection unit and the second driving lane width $W_{L2}$ predetermined according to the road type, and the second front vehicle width $W_{V2}$ corresponding to the actual width of the front vehicle as shown in equation (1).

$$\text{First driving lane width } W_{L1} : \text{second driving lane width } W_{L2} = \text{first front vehicle width } W_{V1} : \text{second front vehicle width } W_{V2} \quad \text{equation (1)}$$

That is, the second front vehicle width $W_{V2}$ corresponding to the value of the actual width of the front vehicle may be determined as a value generated by dividing a value, which is generated by multiplying the first driving lane width $W_{L1}$ measured by the detection unit and the second driving lane width $W_{L2}$ predetermined by the driving road type, by the first front vehicle width $W_{V1}$ measured by the detection unit.

Further, the detection unit of the driving support apparatus according to the embodiment of the present invention may have a function of re-controlling settings of the camera based on information on one or more detected objects other than the detected front vehicle and driving lane.

More specifically, the camera may detect different colors according to the set brightness and white balance.

For example, the detection unit may compare colors of one or more detected traffic signs with already known reference colors of traffic signs and control setting information of the camera such as brightness of the camera and white balance by using a difference value therebetween.

As described above, the first calculation unit of the driving support apparatus according to the embodiment of the present invention may calculate the second front vehicle width $W_{V2}$ corresponding to the actual front vehicle width based on the first front vehicle width $W_{V1}$ and the first driving lane width $W_{L1}$ detected in step S200 and the predetermined second driving lane width $W_{L2}$ for the driving lane in S210.

The predetermined second driving lane width $W_{L2}$ for the driving lane is predetermined according to regulations based on information on a region where the driving lane exists, road type information, and a limited speed (designed speed information) or a predetermined rule.

[Table 1] below shows driving lane width information according to, for example, each road type, each region, and each limited speed in Korea.

TABLE 1

|  |  | Local area | City area | Small vehicle road |
|---|---|---|---|---|
| Expressway | | 3.50 [m] | 3.50 [m] | 3.25 [m] |
| General road | 80 [Km] or faster | 3.50 [m] | 3.25 [m] | 3.25 [m] |
| | 70 [Km] or faster | 3.25 [m] | 3.25 [m] | 3.00 [m] |
| | 60 [Km] or faster | 3.25 [m] | 3.00 [m] | 3.00 [m] |
| | slower than 60 [Km] | 3.00 [m] | 3.00 [m] | 3.00 [m] |

By applying [Table 1], the second driving lane width may be set as 3.50 m when the user's vehicle is driving on the expressway located in the local area.

At this time, in order to calculate the second driving lane width, a region where the user's vehicle is currently driving and a road type should be determined. Accordingly, map information of a navigation device installed in the vehicle and a global positioning system (GPS) may be used to determine them.

That is, the first calculation unit 120 may recognize the type, the region, and the limited speed of the driving road on which the vehicle is currently driving through the navigation map information and the GPS, and may then determine the second driving lane width based on them.

Alternatively, the detection unit 110 photographs traffic signs or a surrounding state and analyze them to detect the type, the region, and the limited speed of the driving road, and then may determine the second driving lane width based on them.

For example, the detection unit 110 including the camera has a Traffic Sign Recognition (TSR) function and recognizes characters (expressway number and local road number) displayed on a road sign to recognize the type, the region, and the limited speed of the driving road, and then may determine the second driving lane width based on them.

Accordingly, the first calculation unit according to an embodiment of the present invention may calculate the second front vehicle width $W_{V2}$ corresponding to the actual front vehicle width by applying the first driving lane width $W_{L1}$ and the first front vehicle width $W_{V1}$ detected in step S200 and the second driving lane width $W_{L2}$ corresponding to the predetermined driving lane width to equation (1).

When the second front vehicle width $W_{V2}$ is calculated through step S210, in S220, the second calculation unit according to an embodiment of the present invention may calculate the distance from the front vehicle based on the first front vehicle width $W_{V1}$ detected in step S200 and the second front vehicle width $W_{V2}$ calculated in step S210, and a focal length 323 of the camera used in step S200.

Referring to FIG. 4B for a detailed description, the first front vehicle width $W_{V1}$, the second front vehicle width $W_{V2}$, the focal length 323 of the lens of the detection unit, and the distance from the front vehicle 330 may have a proportional relation as shown in equation (2) below.

First front vehicle width $W_{V1}$ second front vehicle width $W_{V2}$=focal length 323:distance from front vehicle 330　　　equation (2)

The proportional relation of equation (2) may be established under one of the triangle similarity conditions.

That is, the second calculation unit 130 calculates the distance from the front vehicle based on the first front vehicle width $W_{V1}$ measured by the detection unit, the focal length of the detection unit, and the second front vehicle width $W_{V2}$ calculated by the first calculation unit 120.

More specifically, based on equation (2), the distance D from the front vehicle may be calculated as a value generated by dividing a value, which is generated by multiplying the second front vehicle width $W_{V2}$ and the focal length, by the first front vehicle width $W_{V1}$.

As described above, the driving support apparatus according to the embodiment of the present invention that performs steps S200 to S220 has an effect of recognizing the accurate distance from the front vehicle through the camera device alone.

Figure 5:
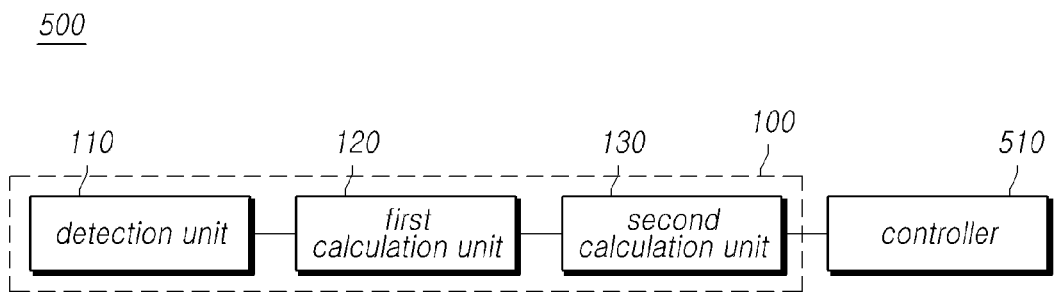
FIG. 5 illustrates a configuration of a driving support apparatus according to another embodiment of the present invention.

FIG. 5 illustrates a configuration of a driving support apparatus according to another embodiment of the present invention.

Referring to FIG. 5, a driving support apparatus 500 according to another embodiment of the present invention may further include a controller 510 operating based on the distance from the front vehicle calculated by the driving support apparatus 100 according to the embodiment of the present invention described through FIGS. 1 to 4B.

When the distance from the front vehicle calculated by the driving support apparatus 100 according to the embodiment of the present invention is shorter than a preset safe distance, the controller 510 may make a control to increase the distance from the front vehicle by controlling the brake included in the user's vehicle.

When the driver recognizes an object and operates the brake, the safe distance may correspond to a distance by which the user's vehicle moves and may reflect a performance of the brake of the user's vehicle and a user's motor nerve and may be set based on experimental data on the performance of the brake and the user's motor nerve.

For example, the safe distance may further increase as the performance of the brake of the user's vehicle is lower and may further decrease as the driver has a better motor nerve.

The driving support apparatus 500 according to the other embodiment of the present invention will be described in detail with reference to FIG. 6.

Figure 6:
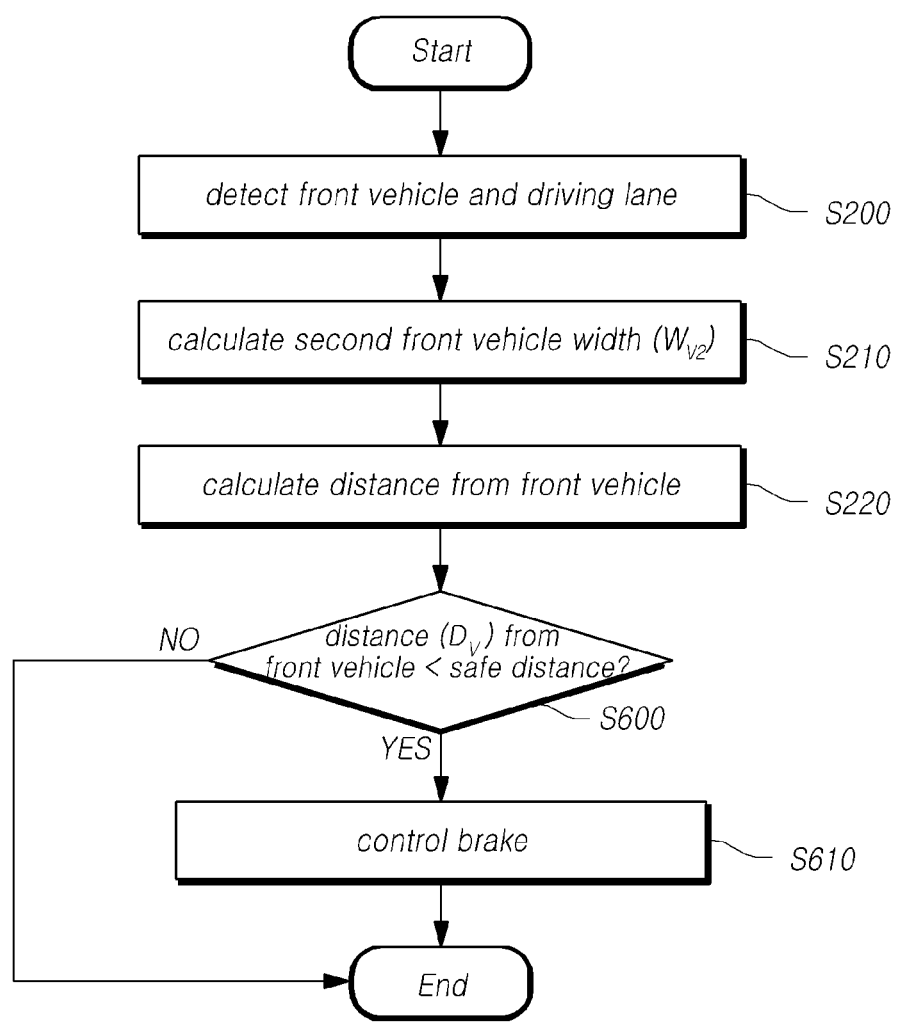
FIG. 6 illustrates an example for describing an operation of the driving support apparatus according to the other embodiment of the present invention.

FIG. 6 illustrates an example for describing an operation of the driving support apparatus according to the other embodiment of the present invention.

Referring to FIG. 6, the detection unit of the driving support apparatus according to the other embodiment of the present invention may detect a user's vehicle and a front vehicle located in front of the user's vehicle or a driving lane on which the front vehicle is driving based on image output by a camera that detects the front in S200.

Thereafter, the first calculation unit of the driving support apparatus according to the other embodiment of the present invention may calculate the second front vehicle width $W_{V2}$ based on the first front vehicle width $W_{V1}$ and the first driving lane width $W_{L1}$ detected in step S200 and the predetermined and already known second driving lane width $W_{L2}$ for the driving lane in S210.

When the second front vehicle width $W_{V2}$ is calculated through step S210, in S220, the second calculation unit according to an embodiment of the present invention may calculate the distance from the front vehicle based on the first front vehicle width $W_{V1}$ detected in step S200 and the second front vehicle width $W_{V2}$ calculated in step S210, and the focal length 323 of the camera used in step S200.

Since steps S200 to S220 described above are the same as the operations of the driving support apparatus according to the embodiment of the present invention described in FIG. 2, a detailed description thereof will be omitted.

Thereafter, the controller of the driving support apparatus according to the other embodiment of the present invention determines whether the distance D from the front vehicle calculated in step S220 is shorter than a preset safe distance in S600.

When the driver recognizes an object and operates the brake, the safe distance may correspond to a distance by which the user's vehicle moves and may reflect a performance of the brake of the user's vehicle and a user's motor nerve and may be set based on experimental data on the performance of the brake and the user's motor nerve.

For example, the safe distance may further increase as the performance of the brake of the user's vehicle is lower and may further decrease as the driver has a better motor nerve.

When it is determined that the distance D from the front vehicle is shorter than the preset safe distance in step S600 (YES), the controller according to the other embodiment of the present invention may increase the distance from the front vehicle by controlling the brake in S610.

Although it is described that the controller increases the distance from the front vehicle by controlling the brake in step S610, the present invention is not limited thereto and the controller may control a speed control unit which may reduce the speed of the user's vehicle. For example, the present invention may include an operation for controlling an operating acceleration unit to not operate.

The driving support apparatus according to the other embodiment of the present invention operating as described above may control the distance from the front vehicle to be longer than the safe distance based on the more accurately recognized distance from the front vehicle, so that the user's vehicle has an effect of reducing the risk of collision with the front vehicle.

Hereinafter, a driving support method corresponding to the operation performed by the driving support apparatus described with reference to FIGS. 1 to 6 will be briefly described.

Figure 7:
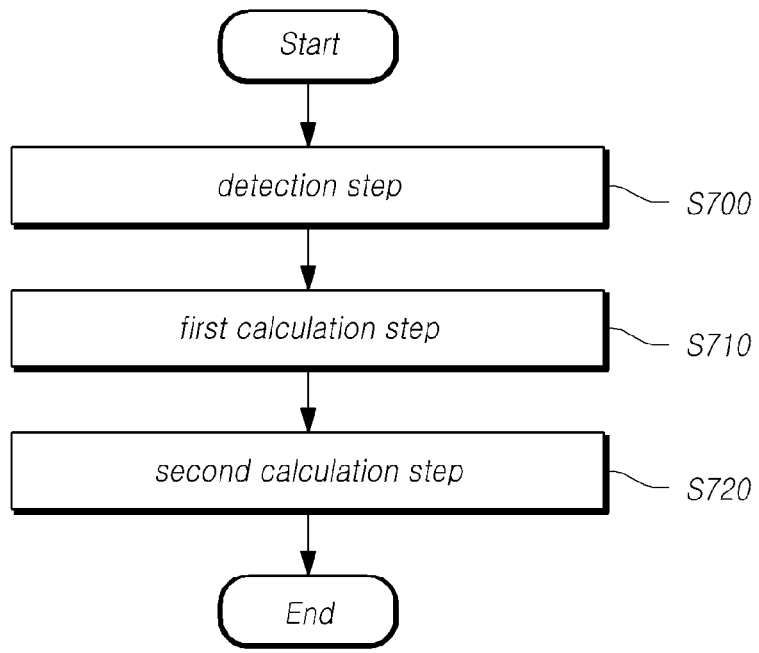
FIG. 7 is a flowchart illustrating a driving support method according to an embodiment of the present invention.

FIG. 7 is a flowchart illustrating the driving support method according to the embodiment of the present invention.

Referring to FIG. 7, the driving support method according to the embodiment of the present invention may include a detection step S700 of detecting a user's vehicle or a front vehicle located in front of the user's vehicle or a driving lane on which the front vehicle is driving based on image data output from a camera which detects the front, a first calculation step S710 of calculating a second front vehicle width for the front vehicle based on a first front vehicle width for the front vehicle detected by the camera, a first driving lane width for the driving lane detected by the camera, and a preset second driving lane width for the driving lane; and a second calculation step S720 of calculating a distance from the front vehicle based on a focal length of the camera, the first front vehicle width, and the second front vehicle width.

In the detection step S700, the front vehicle and the driving lane may be detected based on image data output by the camera or detection unit including a light collector such as a lens for receiving light, an imaging unit for generating an image from the light received from the light collector, and a control unit for controlling a state.

The light collector corresponds to an element for receiving light and forming an image on the imaging unit, and there are various schemes from a simple scheme using a small hole, such as a pinhole camera model, to a complicated scheme using various types of multiple lenses. A light collector of a general camera includes a lens, an aperture, and a unit for controlling a distance of the lens. In general, the light collector is also called a photographic lens. The imaging unit corresponds to an element on which an image is formed by the light from the light collector. While a film camera makes a photo by putting a film having photosensitivity on the imaging unit to perform photography and developing and printing the film, a digital camera puts a device (CMOS or CCD) for converting a light signal to an electrical signal on the imaging unit and stores a digital image converted into the electrical signal as various types of image files in a storage medium. The control unit corresponds to an element operating to acquire a desired image and may representatively include an aperture for controlling a hole size of the light collector and a shutter for receiving or blocking the light. For example, the proper imaging may be made through a decrease in light by reducing the hole size of the aperture in a bright place and an increase in light by opening the aperture in a dark place. Further, a still image may be made by making an operation of the shutter fast with respect to a fast motion of an athlete. In addition, the control unit may include devices such as a flash for photographing in a dark place and a viewfinder that the user looks through in advance in order to see what the user going to photograph.

That is, when the front vehicle and the driving lane are detected through the camera in the detection step S700, images for the front vehicle and the driving lane are formed, and a first front vehicle width corresponding to a width size of the front vehicle on the formed image and a first driving lane width corresponding to a width size of the driving lane on the formed image may be measured.

Further, in the detection step S700, settings of the camera may be re-controlled using information on one or more objects other than the detected front vehicle and driving lane. At this time, the re-controlled settings of the camera or the detection unit may include brightness and white balance, and may further include other settings involved in the output of the image data.

According to the control of the settings of the camera, the detection step S700 may have an effect of accurately detecting the front vehicle and the driving lane in the output image data. Accordingly, the distance from the front vehicle calculated by the driving support method according to the embodiment of the present invention may become more accurate.

In the first calculation step S710, a second front vehicle width for the front vehicle may be calculated based on the first front vehicle width and the first driving lane width detected in the detection step S700 and the already known second driving lane width for the driving lane.

The second driving lane width refers to an actual width of the driving road on which the user's vehicle is driving, and may be a predetermined value based on at least one of location information (a region and a country) of the user's vehicle, a road type of the driving lane, driving information such as a limited speed, and object information detected by the detection unit.

Information on a road including the lane width and information on facilities are required by regulations according to each country, each road, a limited speed (road design speed), and each region.

For example, with respect to the rule of the expressway of Korea, a lane with of the expressway located in a local area corresponds to 3.5 m, a lane width of the expressway located in a city area corresponds to 3.5 m, and a lane width of a small vehicle road belonging to the expressway corresponds to 3.25 m.

The rule of the lane width of the general road of Korea is determined in more detail according to limited speed information.

In a first example, with respect to the rule of the general road, a lane width of the general road that is located in a local area and has a design speed faster than or equal to 80 km/h corresponds to 3.5 m, a lane width of the general road that is located in a city area and has a design speed faster than or equal to 80 km/h corresponds to 3.25 m, and a lane width of a small vehicle road belonging to the general road having a design speed faster than or equal to 80 km/h corresponds to 3.25 m.

In a second example, with respect to the rule of the general road, a lane width of the general road that is located in a local area and has a design speed faster than or equal to 70 km/h corresponds to 3.25 m, a lane width of the general road that is located in a city area and has a design speed faster than or equal to 70 km/h corresponds to 3.25 m, and a lane width of a small vehicle road belonging to the general road having a design speed faster than or equal to 70 km/h corresponds to 3.00 m.

In a third example, with respect to the rule of the general road, a lane width of the general road that is located in a local area and has a design speed faster than or equal to 60 km/h corresponds to 3.25 m, a lane width of the general road that is located in a city area and has a design speed faster than or equal to 60 km/h corresponds to 3.00 m, and a lane width of a small vehicle road belonging to the general road having a design speed faster than or equal to 60 km/h corresponds to 3.00 m.

In a fourth example, with respect to the rule of the general road, a lane width that is located in a local area and has a design speed slower than 60 km/h corresponds to 3.00 m, a lane width that is located in a city area and has a design speed slower than 60 km/h corresponds to 3.00 m, and a lane width of a small vehicle road belonging to the general road having a design speed slower than 60 km/h corresponds to 3.00 m.

That is, the second driving lane width may be set by applying the rule corresponding to the recognized driving road information based on at least one of the location information of the user's vehicle, driving information of the user's vehicle, and object information detected in the detection step S700. The driving information of the user's vehicle may be information including speed information, brake information, and steering information, and the object information may be information including information on facilities on the road and information on signs.

In the first calculation step S710, as described above, the second front vehicle width corresponding to an actual width of the front vehicle may be calculated using a proportional relation of the predetermined second driving lane width, and the first front vehicle width and the first driving lane width measured in the detection step.

In the second calculation step S720, the distance from the front vehicle may be calculated based on the focal length of the camera that outputs image data in the detection step S700, the first front vehicle width detected in the detection step S700, and the second front vehicle width calculated in the first calculation step S710.

Here, a ratio between the focal length of the camera and the distance from the front vehicle may correspond to a distance ratio between the first front vehicle width and the second front vehicle width. That is, the distance from the front vehicle may be calculated in the second calculation step S720 by applying the focal length of the camera, the first front vehicle width acquired through the detection step S700 and the first calculation step S700, and the value of the second front vehicle width calculated in the first calculation step to the proportional relation.

Further, the driving support method according to the other embodiment of the present invention may further include a control step executed based on the distance from the front vehicle calculated in the second calculation step S720.

In the control step, when the distance from the front vehicle calculated in the second calculation step S720 is shorter than a preset safe distance, the distance from the front vehicle may be increased by controlling a brake.

Further, the driving support method according to the present invention may perform each of all the operations performed by the driving support apparatus according to the present invention described based on FIGS. 1 to 6.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A driving support apparatus comprising:
   a detection circuit, including a camera, configured to detect a driving lane on which a user's vehicle and a front vehicle located in front of the user's vehicle are driving based on image data output from a camera which detects the front;
   a first calculation circuit configured to calculate a second front vehicle width for the front vehicle based on a first front vehicle width for the front vehicle measured on the image data, a first driving lane width for the driving lane measured on the image data, and a second driving lane width corresponding to an actual lane width of the driving lane predetermined according to a characteristic of the driving lane; and
   a second calculation circuit configured to calculate a distance from the front vehicle based on a focal length of the camera, the first front vehicle width, and the second front vehicle width;
   wherein the characteristic of the driving lane for determining the second driving lane width includes one or more of a region where the driving lane exists, a road type of the driving lane, and a limited speed of the driving lane, and
   wherein the second front vehicle width is determined as a value generated by dividing a value, which is generated by multiplying the first driving lane width and the second driving lane width, by the first front vehicle width.

2. The driving support apparatus of claim 1, wherein the distance from the front vehicle is calculated as a value generated by dividing a value, which is generated by multiplying the second front vehicle width and the focal length of the camera, by the first front vehicle width.

3. The driving support apparatus of claim 2, wherein, when one or more objects other than the front vehicle and the driving lane are detected, the detection circuit re-controls settings of the camera based on information on the objects.

4. The driving support apparatus of claim 3, wherein the re-controlled settings of the camera include one or more of brightness and white balance.

5. The driving support apparatus of claim 1, further comprising a controller, including electrical circuits, configured to increase the distance from the front vehicle by controlling a brake when the distance from the front vehicle is shorter than a preset safe distance.

6. A driving support method comprising:
   a detection step of detecting a driving lane on which a user's vehicle and a front vehicle located in front of the user's vehicle are driving based on image data output from a camera which detects the front;
   a first calculation step of calculating a second front vehicle width for the front vehicle based on a first front vehicle width for the front vehicle measured on the image data, a first driving lane width for the driving lane measured on the image data, and a second driving lane width corresponding to an actual lane width of the driving lane predetermined according to a characteristic of the driving lane; and
   a second calculation step of calculating a distance from the front vehicle based on a focal length of the camera, the first front vehicle width, and the second front vehicle width,
   wherein the characteristic of the driving lane for determining the second driving lane width includes one or more of a region where the driving lane exists, a road type of the driving lane, and a limited speed of the driving lane in the first calculation step, and
   wherein, in the first calculation step, the second front vehicle width is determined as a value generated by dividing a value, which is generated by multiplying the first driving lane width and the second driving lane width, by the first front vehicle width.

7. The driving support method of claim 6, wherein, in the second calculation step, the distance from the front vehicle is calculated as a value generated by dividing a value, which is generated by multiplying the second front vehicle width and the focal length of the camera, by the first front vehicle width.

8. The driving support method of claim 7, wherein the detection step comprises re-controlling settings of the camera based on information on one or more objects other than the front vehicle and the driving lane.

9. The driving support method of claim 8, wherein the re-controlled settings of the camera include one or more of brightness and white balance.

10. The driving support method of claim 6, further comprising a control step of increasing the distance from the front vehicle by controlling a brake when the distance from the front vehicle is shorter than a preset safe distance.

* * * * *